United States Patent [19]

Minato et al.

[11] 3,873,487

[45] Mar. 25, 1975

[54] SUBSTANTIALLY WATER-INSOLUBLE POLYMERIC SOIL CONDITIONER FOR IMPROVING THE PHYSICAL STRUCTURE OF SOILS

[75] Inventors: Takashi Minato; Shinsuke Takegami; Soichiro Kishimoto; Katsutoshi Kanetsuki, all of Okayama, Japan

[73] Assignee: Japan Exlan Company Limited, Osaka, Japan

[22] Filed: Mar. 30, 1973

[21] Appl. No.: 347,407

[30] Foreign Application Priority Data

Apr. 10, 1972 Japan............................. 47-035849

[52] U.S. Cl............ 260/29.6 WB, 61/35, 71/64 SC, 252/8.5 LC, 210/54, 260/17 R, 260/17.4 ST, 260/29.6 SQ, 260/874
[51] Int. Cl. ............................................ C08f 45/24
[58] Field of Search....... 210/54; 260/17.4 ST, 17.5, 260/17 R, 874, 29.6 WB, 29.6 SQ; 71/64 G, 64 SC

[56] References Cited

UNITED STATES PATENTS

| 3,077,054 | 2/1963 | Niemeijer ........................... 260/17.4 |
| 3,321,649 | 5/1967 | Benedictis............................. 210/54 |
| 3,615,794 | 10/1971 | Nimerick ........................... 260/17.4 |
| 3,740,360 | 6/1973 | Nimerick ........................... 260/17.4 |
| 3,743,613 | 7/1973 | Coulter et al...................... 260/17.4 |

FOREIGN PATENTS OR APPLICATIONS

| 487,987 | 11/1952 | Canada............................... 210/54 |
| 559,303 | 6/1958 | Canada............................... 210/54 |

Primary Examiner—Morris Liebman
Assistant Examiner—Edward Woodberry
Attorney, Agent, or Firm—Wenderoth, Lind & Ponack

[57] ABSTRACT

A soil conditioner consisting substantially of a water-swellable or water-insoluble polymer obtained by flocculating an initial reaction product of a water-soluble polymer containing acid groups and trivalent or higher valent polycations with each other with an anionic high molecular weight flocculant, which is applied to soil to improve the water-retentivity and fertilizer-retentivity.

10 Claims, No Drawings

SUBSTANTIALLY WATER-INSOLUBLE POLYMERIC SOIL CONDITIONER FOR IMPROVING THE PHYSICAL STRUCTURE OF SOILS

This invention relates to a soil conditioner consisting of a substantially water-insolubilized polymer and, more particularly, to a novel soil conditioner consisting substantially of a water-swellable or water-insoluble polymer obtained by flocculating an initial reaction product of a water-soluble polymer containing acid groups and trivalent or higher valent polycations with each other with an anionic high molecular weight flocculant to remarkably improve the water-retentivity and fertilizer-retentivity of a soil, to accelerate the aggregation of the soil, to improve the water-permeability and gas-permeability of the soil and to maintain these effects.

It is already known that a water-soluble synthetic polyelectrolyte having a straight chain structure and called a soil conditioner or soil stabilizer is conventionally used to improve such physical and dynamic properties of a soil as, for example, the gas-permeability, erosion, water-retentivity, tilling ease, water-permeability, compressibility and shearing strength, and that these effects are recognized.

However, such soil conditioner or soil stabilizer as has been already suggested is essentially water-soluble and therefore is defective in that it easily flows out with rain and water and does not maintain its soil modifying effect for a long time. Further, a water-insoluble soil modifier has been suggested in order to eliminate this defect but is so poor in its affinity with water as to be remarkably low in the water retaining property as a soil conditioner.

Here, as a result of serious research to improve such defects, the present inventors have discovered that such excellent soil modifying effects as water-retentivity, fertilizer-retentivity, gas-permeability, water-permeability and tilling ease attained and can be made lasting by using as a soil conditioner a product obtained by causing an ionic cross-linking reaction between an acid group contained in a water-soluble polymer and a polycation to make the polymer water-insoluble, or water-swellable and then reacting this initial product with an anionic high molecular weight flocculant.

The main object of the present invention is to provide a novel soil conditioner.

One object of the present invention is to attain lasting soil modifying effects which have never been achieved with conventional soil conditioners when such soil conditioner is a reaction product of a polycation and soluble polymer made water-insoluble or water-swellable by applying an anionic high molecular weight flocculant.

Other objects of the present invention will become clear from the below mentioned concrete explanation of the present invention.

Such objects of the present invention as are mentioned above are attained by using as a soil conditioner a water-swellable or water-insoluble polymer obtained by flocculating the initial reaction product of a water-soluble polymer containing an acid group and a trivalent or higher valent polycation with an anionic high molecular weight flocculant.

That is to say, the soil conditioner according to the present invention is a water-insoluble or water-swellable polymer obtained by applying an anionic high molecular weight flocculant to an initial reaction product made insoluble in water by ionically bonding an acid group contained in a water-soluble polymer molecule and a polycation to bond (ionically cross-link) the above mentioned polymer molecules with each other through said polycation. This conditioner contains a large amount of hydrophilic ionizable groups (acid groups), remarkably improves the water-retentivity of a soil, effectively absorbs and retains a fertilizing component, does not flow away even with a large amount of rainfall and feeds nutrients to the roots of vegetables to accelerate their growth. On the other hand, the conventionally used soil conditioner is so water-soluble that it can not be prevented from naturally flowing away with the movement of water and can not be expected to have a lasting effect.

The soil conditioner of the present invention is so insoluble in water that it does not flow away with the movement of water, therefore lastingly retaining its properties as of a soil conditioner, and need not be applied as often as a compost. Further, the soil in which the soil conditioner according to the present invention is mixed is of a water-proof porous coarse granular structure. Such soil is gas-permeable, water-permeable and easily tillable, and can prevent surface solidification while elevating the irrigating effect.

Prior to the present invention, the present inventors had discovered that a soil modifying effect was recognized in a water-insoluble or water-swellable polymer obtained by ionically cross-linking an acid group-containing water-soluble acrylonitrilic polymer with a polyvalent metallic cation. The present invention uses as a soil conditioner a substantially water-insoluble or water-swellable polymer obtained by applying an anionic high molecular weight flocculant to such reaction product made water-insoluble or water-swellable with a polycation so that an electric mutual action may be caused between the anion in said flocculant and the cation remaining in the above mentioned reaction product and thereby further improves such soil modifying effects as the aggregation, water-retentivity and fertilizer-retentivity of a soil, as well as the water-proofness of the formed grains.

The following water-soluble polymers can be used in the present invention: natural or synthetic high molecular weight compounds made water-soluble by containing large amounts of such acid groups as a sulfonic acid group and carboxyl group as, for example, such natural high polymers as alginic acid, ligninsulfonic acid and carboxylmethyl cellulose and their salts; synthetic polymers such as homopolymers or copolymers of acid group-containing unsaturated monomers such as unsaturated sulfonic acids (for example, vinylsulfonic acid, allylsulfonic acid or styrenesulfonic acid) and their salts, and unsaturated carboxylic acids (for example, acrylic acid, maleic acid or itaconic acid) and their salts and copolymers of these acid group-containing unsaturated monomers with other neutral ethylenically unsaturated monomers (for example, acrylonitrile, vinyl esters, vinyl ethers, acrylates, styrene and vinyl halides); and graft polymers of natural and synthetic polymers of the above mentioned acid group-containing unsaturated monomers.

Further, even a polymer which does not contain the above mentioned acid group-containing unsaturated monomer unit but has been made water-soluble can be advantageously used as a water-soluble polymer in the present invention. Such polymer may be modified by introducing an acid group, such as a sulfuric acid group or sulfonic acid group into the molecular terminal by using inorganic persulfate and/or bisulfate in the polymerization initiator system used in the producing process; a polymer modification made water-soluble by introducing such acid group as a carboxyl group into it ordinary hydrolysis to a homo- or co-polymer of an unsaturated monomer (such as acrylonitrile, acrylamide, maleate or acrylate) which can produce an acid group; or a natural or synthetic polymer as sulfonated.

The content of the acid group in the water-soluble polymer introduced by such operation as a copolymerization or hydrolysis or from the polymerization initiator system is different depending on the kind of the polymer to be used, is difficult to define clearly and is properly determined by the molecular weight of the polymer, the copolymer composition and the kind of the copolymer or acid group. Further, the water-soluble synthetic polymer can be obtained by such already well known polymerizing process as emulsion-polymerization, solution-polymerization or aqueous (suspension) polymerization. The molecular weight of the water-soluble polymer to be used in the present invention is different depending on the kind of polymer, the copolymer composition, the kind of the comonomer and the kind and content of the acid group contained therein. However, any polymer satisfying the requirements of the present invention, i.e. that it should contain an acid group and should be water-soluble, can be adopted. For example, polymers in a wide range from a low polymerization degree polymer having a molecular weight of about 500 to a high polymerization degree polymer having a molecular weight of several hundred thousands can be used.

Such water-soluble polymer, firstly, is converted into a water-insoluble reaction product by bonding the molecules of said polymer with each other through a trivalent or higher valent polycation by an ionic cross-linking. Such reaction is the first step reaction according to the present invention. The trivalent or higher valent polycations to be used are metallic cations, such as aluminum or ferric ions; organic polycations such as polyethyleneimine or synthetic vinyl polymers containing basic groups, e.g. polyvinylpyridine, polydimethylaminoethyl methacrylate, a polymer of 2-hydroxy-3-methacryloxypropyl-trimethylammonium chloride, polyvinyl benzyltrimethylammonium chloride, polyvinylimidazole or hydrazide polyacrylate. The above mentioned metallic cations are used in the form of a hydroxide, sulfate, nitrate, chloride and carbonate. It is noted that when an aluminum ion among such polycations is used, the effect of the present invention is remarkable. The amount of the polycation to be used is different depending on the kind and content of the acid group in the water-soluble polymer, is difficult to clearly define and is properly determined to be sufficient to deposit the water-insoluble substance or water-swellable substance of said polymer.

The water-insoluble or water-swellable reaction product or initial reaction product obtained by the ionic cross-linking with the polycation is then flocculated with an anionic high molecular weight flocculant and is used as a soil conditioner according to the present invention. By the application of such anionic high molecular weight flocculant, the soil modifying effect of the water-insoluble or water-swellable polymer obtained from the water-soluble polymer is further increased.

Here, the flocculating mechanism of such anionic high molecular weight flocculant according to the present invention is not yet clear but it is thought that the molecular weight is further increased by the bonding of said initial reaction product molecules with each other through the anionic high molecular weight flocculant by the electric mutual action of said flocculant and the initial reaction product. It is presumed that, as concretely shown in the following example, in the ionic cross-linking of the acid group in the water-soluble polymer and the polycation and the anion in the anionic high molecular weight flocculant, the above mentioned reaction product is flocculated to become a water-insoluble or water-swellable polymer further increased in molecular weight.

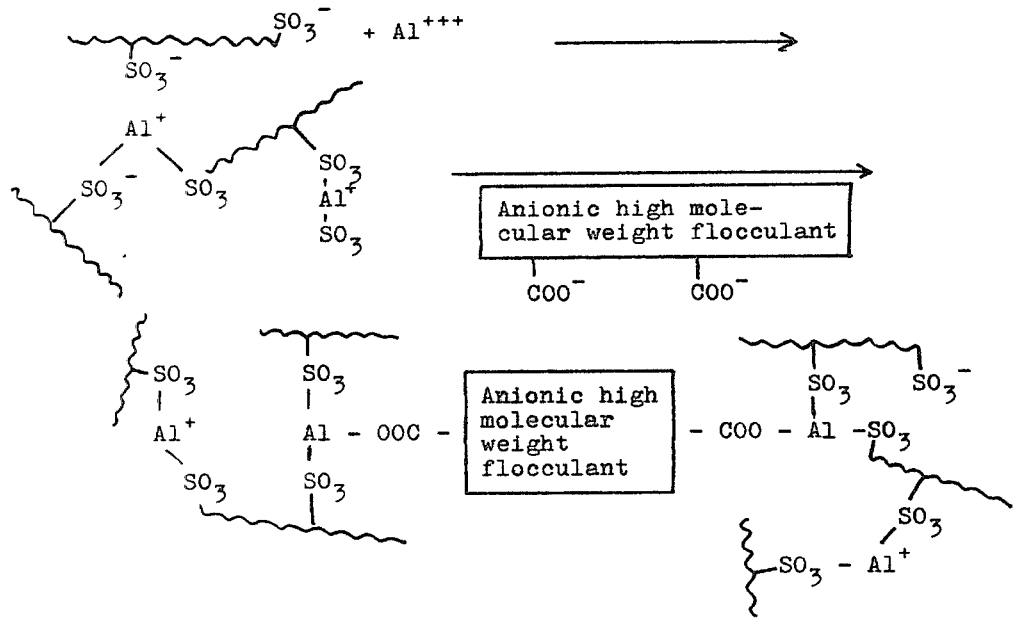

The anionic high molecular weight flocculant to be used in the present invention is a high molecular weight compound containing such acid groups as a carboxyl group or sulfonic acid group or their salts, and is high in the capacity of flocculating (coagulating) coarse grains in a suspension to form a floc (flocculated assembly). For example, the following are suitable homopolymers, and copolymers of such unsaturated carboxylic acid as acrylic and, methacrylic acid and itaconic acid and their salts; partially hydrolyzed polyacrylamides, sulfonated derivatives of polyacrylamides, copolymers of acrylamide and styrenesulfonic acid or its salt, copolymers of (1) maleic acid or its salt and (2) vinyl acetate, vinylmethyl ether or ethylene or other vinyl olefins; and polystyrenesulfonic acids and their salts. Such anionic high molecular weight flocculant is generally a synthetic polymer of a high polymerization degree having a molecular weight of about 500,000 to about 10,000,000 and, as required, a nonionic polar group (such as, for example, —OH, —CONH$_2$ or —CN) is introduced into it to improve the flocculating performance. In the present invention, such anionic high molecular weight flocculant is generally used in an amount of 0.1 to 10 percent by weight of the above mentioned initial reaction product, but may be used in an amount exceeding 10 percent so long as it has no bad influence on the soil conditioner effect of the soil modifier according to the present invention.

This anionic high molecular weight flocculant is called a high molecular weight coagulant or high molecular weight flocculant on the other hand and is sold with such trade names Himolock (produced by Kyoritsu Organic Industrial Laboratory), Accoflock (produced by Sankyo Chemical Co.), Sanflock (produced by Sanyo Chemical Co.), Kuriflock (produced by Kurita Industrial Co.), Aronflock (produced by Toa Synthetic Co.), Sumiflock (produced by Sumitomo Chemical Company, Limited), Diaclear (produced by Mitsubishi Chemical Co.), Separan (produced by Dow Chemical Co.), Aerofloc (produced by American Cyanamid Co.), Polyox (produced by Union Carbide Co.) and Goodlite (produced by Goodrich Chemical Co.).

The anionic high molecular weight flocculant to be used in the present invention is a polymer containing an acid group the same as the above described water-soluble polymer, but is different from the above mentioned water-soluble polymer whose flocculating performance (flocculating force) is not substantially recognized or is weak. It is a polymer whose flocculating performance is increased by the activation of the polymer molecule by the adjustment of the nonionic polar group and ionic group and which has a molecular weight higher than said water-soluble polymer as mentioned on pages 612 to 614 of Vol. 8 and pages 413 to 418 of Vol. 17 of The High Polymers ("Kobunshi" in Japanese).

The soil conditioner obtained according to the present invention is applied to planting trees, growing seedlings and gardening in the same manner as the known conventional soil conditioner. In case it is to be mixed in a soil, it is preferable to add it by not less than 1 percent on the soil. Further, it is possible to use it mixed with such other substances as, for example, a fertilizer of any kind, plant growth accelerator, sterilizer, diatomaceous earth, clay, lime, agricultural chemicals or any other soil conditioner. It can be applied not only to a cultivated grounds but also to sporting fields, golf links and parks.

It is one of the remarkable features of the present invention that, as different from the conventional soil conditioners, plants can be grown with the soil conditioner according to the present invention alone instead of a soil.

The following examples further explain the present invention but are not to limit the scope of the present invention. The percentages and parts shown in the examples are all by weight unless otherwise specified.

EXAMPLE 1

As water-soluble polymers containing acid groups, there were used a sodium polyacrylate (of an intrinsic viscosity of 1.92 in a 1 N aqueous solution of NaCl at 40°C., the method of measuring the intrinsic viscosity being the same hereinafter), a hydrolyzed copolymer (of an intrinsic viscosity of 1.06) consisting of 90 percent acrylonitrile and 10 percent methyl acrylate, a copolymer (Of an intrinsic viscosity of 0.84) consisting of 90 percent acrylamide and 10 percent sodium acrylate and sodium alginate. 2000 to 4000 p.p.m. (abbreviation of parts per million) of aluminum sulfate were added to an aqueous solution of 1 percent of each of these polymers at a pH of 4 to 5 and temperature of 30° to 40°C. to deposit an initial reaction product, then 200 p.p.m. of an acrylamide copolymer (of an intrinsic viscosity of about 12) containing about 10 percent of sodium acrylate as an anionic high molecular weight flocculant were added to it to flocculate it and it was dehydrated to obtain four kinds of soil conditioner according to the present invention.

Each of the thus obtained four kinds of soil conditioner was neutralized with slaked lime, was mixed at such rate as in Table 1 into a sandy soil, the water-holding capacity in the soil was measured by the method of the Japan Agricultural Society and the results are shown in Table 1.

As clear from the results in Table 1, it was confirmed that, when the water-insoluble or water-swellable polymer according to the present invention was used as a soil conditioner, the water-retentivity remarkably improved.

The method for measuring water-holding capacity established by the Japan Agricultural Society is as follows. Two glass cylinders (each 5 cm. inside diameter × 5 cm. height) are superposed and the junction is sealed by a tape. The bottom of the assembled cylinder there is closed by a filter paper sheet and cotton fabric. The soil to be tested is placed in the cylinder, which is then set up on a dish containing water in the depth of 0.5 cm. Twenty-four hours after the water has raised through the soil and attained to the top of the cylinder, the cylinder is taken out of the dish and the tape is removed. At the central portion of the junction of each Table I Water-holding capacities
(% on dry soil)

| Amount of addition (in %) as converted to solid part | Kinds of used water-soluble polymers (%) | | | |
|---|---|---|---|---|
| | Sodium polyacrylate | Copolymer of AAm/AA-Na | Sodium alginate | Hydrolysis product of copolymer of AN/MA |
| 0 | 27.5 | 27.5 | 27.5 | 27.5 |
| 0.5 | 32.1 | 34.8 | 33.2 | 30.1 |
| 1.0 | 33.3 | 37.5 | 42.4 | 33.1 |
| 5.0 | 42.0 | 49.5 | — | 42.9 |
| 10.0 | 52.7 | 62.9 | — | 53.1 |

Notes: AAm = Acrylamide, AA-Na = Sodium acrylate, AN = Acrylonitrile, and MA = Methyl acrylate.

cylinder, 5 – 10 g. of the soil is taken out and the water content thereof is measured. The amount of water per 100 g. of the soil (as dry) is the water-holding capacity (percent).

EXAMPLE 2

The aggregating effect of each kind of soil conditioner obtained in Example 1 was examined according to the method mentioned on page 263 of Newly Revised Agricultural Chemical Experiment Book (Supplemented) ["Shinkaiteiban Nogeikagaku Jikkensho (Zoho)" in Japanese] Vol. 1 compiled by Agricultural Chemical Class Room of Agricultural Faculty of Kyoto University, Japan and published by Industrial Book Company, Ltd.

That is to say, each soil conditioner was mixed at such rate as in Table 2 into a clay soil and then the soil was air-dried in the shade. When the water content in the soil was substantially below the plastic limit by touch, the soil was crushed with fingers and was passed through a sieve with an orifice diameter of 12 mm. Then 15 g. of this air-dried soil were taken into a small beaker. Water was quickly added so that the sample soil might be completely dipped and the sample was thus left for 2 hours. Then the sample was sieved in water while being rocked up and down 120 times with a sieve of an orifice diameter of 2 mm. Further, the suspension having passed through the sieve of an orifice diameter of 2 mm. was sieved by being rocked up and down 50 times in water by using a sieve of an orifice diameter of 0.2 mm.

The soil remaining on each sieve was dried at a temperature of 105°C. and was weighed to obtain the results in Table 2. By the way, the degree of the water-stability of aggregates in Table 2 is a value determined by the following formula:

$$\text{Degree of the water-stability of aggregates (\%)} = \frac{A - C}{A + B} \times 100$$

(wherein A is a weight of the aggregated soil remaining on the sieve, B is a weight of the soil having passed through the sieve and C is a weight of the soil remaining on the sieve in case a soil not mixed with the soil conditioner was used). It is shown that, the larger said numerical value, the more remarkable the aggregating effect.

It was recognized from the results in Table 2 that the soil conditioner according to the present invention has an excellent aggregating effect.

Table 2

| Kind of used water-soluble polymer | Amount of addition (%) | Degree of water-stability of aggregates (%) | |
|---|---|---|---|
| | | Not less than 2mm. | 2 to 0.2 mm. |
| Sodium polyacrylate | 1 | 0 | 5.2 |
| | 3 | 1.7 | 40.7 |
| | 5 | 16.7 | 33.8 |
| Copolymer of acrylamide and sodium acrylate | 1 | 0 | 5.2 |
| | 3 | 0 | 7.3 |
| | 5 | 5.2 | 15.2 |
| Sodium alginate | 1 | 19.2 | 21.7 |
| | 3 | 42.2 | 0 |
| | 5 | 45.7 | 0 |
| Hydrolyzed copolymer of acrylonitrile and methyl acrylate | 1 | 0 | 13.9 |
| | 3 | 0 | 48.0 |
| | 5 | 5.2 | 42.8 |

EXAMPLE 3

The soil conditioner obtained from sodium polyacrylate in Example 1 was mixed at such rate as in Table 3 into a soil (sandy soil) and the soil was air-dried to be a sample soil.

40 g. of the air-dried sample soil were put into a glass cylinder of an inside diameter of 1 cm., 1.0 ml. of an aqueous solution of 11 percent ammonium sulfate was added to the soil from the top part of the charge layer, the soil was left for 5 minutes and then water was added to the soil from the top part of the charge layer until the amount of water flowing out of the bottom part of the charge layer reached 25 ml. The ammonia nitrogen in the water flowing out was analyzed by Nessler's colorimetry and the results are shown in Table 3. By the way, for Nessler's colorimetry, the method mentioned on page 134 of New Revised Agricultural Chemical Experiment Book (Supplemented) Vol. 1 in Example 2 was adopted.

As clear from the results in Table 3, it was recognized that the soil with the soil conditioner according to the present invention was low in the rate of the outflow of the ammonia nitrogen flowing and was therefore high in the fertilizer-retentivity.

Table 3

| Amount of addition of soil conditioner (parts per 100 parts of sandy soil) | Rate of outflow of nitrogenous fertilizer (% on the added fertilizer) |
|---|---|
| 0 | 88 |
| 5 | 5 |
| 10 | 4 |

EXAMPLE 4

The soil conditioner obtained from sodium polyacrylate in Example 1 was neutralized with slaked line, then 0.1 to 5 percent (as converted to the solid part) of it was mixed into a sandy soil. By using this soil as a sample soil, red round radishes were grown under the below mentioned conditions in flowerpots of a diameter of 30 cm. The results are shown in Table 4.

Growing conditions.

Amount of sown seeds: 10 seeds/pot (In one week after the budding, 5 were left by thinning.)
Sample fertilizer: Mixed fertilizer (of 7 percent N, 6 percent P and 19 percent K) for gardening.
Fertilizer application: 2 g. of the original fertilizer/pot and 1 g. of the additional fertilizer/pot (in 2 weeks after the budding).
Irrigation: 200 c.c./pot/2 days.
Growing period: 30 days.

As clear from the results in Table 4, even with the sandy soil improper for the growing of crops, when a small amount of the soil conditioner according to the present invention was mixed into it, the yield of the crops surprisingly increased.

Table 4

| Amount of addition of soil conditioner (%) | Weight* (g.) | Root diameter* (mm.) | Leaf length* (cm.) |
| --- | --- | --- | --- |
| Control (not added) | 2.8 | 11 | 7.5 |
| 0.1 | 2.9 | 14 | 8.0 |
| Amount of addition of soil conditioner (%) | Weight* (g.) | Root diameter* (mm.) | Leaf length* (cm.) |
| 1 | 3.7 | 17 | 8.0 |
| 5 | 5.7 | 19 | 9.1 |

*Shown in the average value of the 5.

EXAMPLE 5

4000 p.p.m. of aluminum sulfate were added at a pH of 4 to 5 and temperature of 30° to 40°C. into an aqueous solution of 1 percent sodium polyacrylate (of an intrinsic viscosity of 2.58) to deposit an initial reaction product and then each of anionic high molecular weight flocculants shown in Table 5 was added to flocculate it and to obtain each soil condition according to the present invention.

The water-retentivity and aggregating effect of each of the thus obtained soil conditioners were measured according to the methods in Examples 1 and 2 and the results are shown in Table 5.

It was recognized from the results in Table 5 that the soil conditioner according to the present invention obtained by applying each of the anionic high molecular weight flocculants has an excellent soil modifying effect.

Table 5

| Used anionic flocculant Kind | Amount of addition of soil modifier (%) | Water content (%) | Degree of water-stability of aggregates (%) | |
| --- | --- | --- | --- | --- |
| | | | >2 mm. | 2 – 0.2 mm. |
| Control (not added) | | 27.5 | — | — |
| Copolymer of 80 % AAm and 20 % AA-Na (of intrinsic viscosity of 11) | 1 | 31.2 | 0 | 4.8 |
| | 5 | 44.3 | 23.7 | 29.2 |
| Copolymer of 46 % AAm, 14 % AA-Na and 40 % VAc (of intrinsic viscosity of 15.6) | 1 | 30.3 | 0 | 1.0 |
| | 5 | 41.2 | 1.5 | 42.4 |
| Copolymer of 65 % AAm and 35 % AA-Na (of intrinsic viscosity of 8) | 1 | 31.9 | 0 | 5.2 |
| | 5 | 40.3 | 17.1 | 34.0 |
| Copolymer * of 66 % AAm and 34 % AA-Na (of intrinsic viscosity of 11) | 1 | 28.5 | 0 | 4.2 |
| | 5 | 40.8 | 12.3 | 36.2 |
| Copolymer * of 75 % AAm and 25 % AA-Na (of intrinsic viscosity of 9) | 1 | 38.1 | 0 | 19.0 |
| | 5 | 42.7 | 15.0 | 33.8 |
| Copolymer of 65 % AAm and 35 % AA-Na (of intrinsic viscosity of 18.6) | 1 | 39.7 | 21.3 | 11.5 |
| | 5 | 42.1 | 54.5 | 0 |

* Hydrolyzed polyacrylamide.
AAm = Acrylamide,
AA-NA = Sodium acrylate and
VAc = Vinyl acetate.

EXAMPLE 6

An initial reaction product obtained by ionically cross-linking with ferric nitrate, polyvinyl pyridine, polydimethylaminoethyl methacrylate, poly-2-hydroxy-3-methacryloxypropyltrimethylammonium chloride or a commercial cationic high molecular weight flocculant (consisting mostly of polyvinyl benzyltrimethylammonium chloride or polyethyleneimine) instead of aluminum sulfate in Example 1 was flocculated by applying an anionic high molecular weight flocculant consisting of an acrylamide polymer (of an intrinsic viscosity of about 12) containing about 10 percent of a sodium acrylate unit to obtain a soil conditioner consisting of a water-insoluble or water-swellable reaction product.

About 5 percent of the thus-obtained soil conditioner was added to a soil to prepare a sample soil and the growth of a lawn in a flower pot by using it was observed. That is to say, seedlings of the lawn were planted in the flower pot containing the sample soil and were irrigated for 2 weeks. After they rooted, the irrigation was stopped and the number of days until they died was observed. As a result, it was confirmed that, in case no soil conditioner was added, they died in about 6 days but that, when the soil conditioner according to the present invention was added, the water-retentivity of the soil was elevated to be so high that, even when the seedlings were not irrigated for more than 15 days, they did not easily die.

EXAMPLE 7

A water-insoluble polymer obtained according to the method in Example 1 from an aqueous solution of a water-soluble acrylonitrilic polymer (of a molecular weight of about 600) containing 78 percent acrylonitrile, 9 percent methyl acrylate and 9 percent sulfonic acid group (introduced from sodium allylsulfonate as a comonomer and a sodium chlorate-sodium sulfite redox catalyst system) was sprinkled as a soil conditioner by 50 and 100 g./m.$^2$ onto a lawn for golf links and the irrigation frequencies required to maintain the lawn ground at the time of a drought in summer were compared. As a result, it was recognized that, in case 50 and 100 g./m.$^2$ of the soil conditioner according to the present invention were sprinkled, the lawn ground could be well maintained respectively with about one-half and one-third the irrigation when it was not sprinkled.

What is claimed is:

1. A soil conditioner consisting essentially of a water-swellable or water-insoluble polymer obtained by
   a. adding a trivalent or higher valent polycation to an aqueous solution of a water-soluble synthetic polymer containing an acid group and having a molecular weight of at least 500 to produce an initial reaction product of the polymer and polycation, said water-soluble polymer being selected from the group consisting of a homo- or co-polymer of an acid group-containing unsaturated monomer, a copolymer of an acid group-containing unsaturated monomer and another neutral ethylenically unsaturated monomer and a hydrolyzed homo- or copolymer of an unsaturated monomer selected from the group consisting of acrylonitrile, acrylamide, maleate and acrylate, and,
   b. then flocculating said initial reaction product with an anionic high molecular weight flocculant, said flocculant being a synthetic organic polymer having a molecular weight of about 500,000 to 10,000,000 containing carboxyl groups or sulfonic acid groups and salts theref as the anionic moiety.

2. A soil conditioner according to claim 1 wherein said water-soluble synthetic polymer is sodium polyacrylate.

3. A soil conditioner according to claim 1 wherein said water-soluble synthetic polymer is a copolymer of acrylamide and sodium acrylate.

4. A soil conditioner according to claim 1 wherein said water-soluble synthetic polymer is a hydrolyzed copolymer consisting of acrylonitrile and methyl acrylate.

5. A soil conditioner according to claim 1 wherein said water-soluble synthetic polymer is an acrylonitrile copolymer containing an acid group.

6. A soil conditioner according to claim 1 wherein said trivalent or higher valent polycation is at least one metallic cation selected from a group consisting of an aluminum ion and a ferric ion.

7. A soil conditioner according to claim 6 wherein said metallic cation is added in the form of a compound selected from a group consisting of a hydroxide, sulfate, nitrate, chloride and carbonate into the aqueous solution of the water-soluble polymer.

8. A soil conditioner according to claim 1 wherein said trivalent or higher valent polycation is a synthetic vinyl polymer containing basic groups.

9. A soil conditioner according to claim 1 wherein said trivalent or higher valent cation is a polyethyleneimine.

10. A soil conditioner according to claim 1 wherein said anionic high molecular flocculant is added in amounts of 0.1 to 10 percent by weight of the initial reaction product.

* * * * *